US008612255B1

(12) United States Patent
Kirsh et al.

(10) Patent No.: US 8,612,255 B1
(45) Date of Patent: *Dec. 17, 2013

(54) SYSTEM AND METHOD FOR STANDARDIZED AND AUTOMATED APPEALS PROCESS

(71) Applicant: eReceivables LLC, Hollywood, FL (US)

(72) Inventors: William D. Kirsh, Miami Beach, FL (US); Peter M. Kramer, Miami Beach, FL (US); Jeffrey T. King, Miami, FL (US)

(73) Assignee: eReceivables, LLC, Hollywood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,656

(22) Filed: Nov. 12, 2012

Related U.S. Application Data

(63) Continuation of application No. 13/473,498, filed on May 16, 2012, now Pat. No. 8,335,702, and a continuation of application No. 09/784,045, filed on Feb. 16, 2001, now Pat. No. 8,204,765.

(60) Provisional application No. 60/183,336, filed on Feb. 18, 2000.

(51) Int. Cl.
*G06Q 50/00* (2012.01)
*G06Q 10/00* (2012.01)

(52) U.S. Cl.
USPC .................................. 705/2; 705/4

(58) Field of Classification Search
USPC .............................................. 705/2
See application file for complete search history.

(56) References Cited

U.S. PATENT DOCUMENTS

| 4,858,121 A | 8/1989 | Barber et al. |
| 5,956,687 A | 9/1999 | Wamsley et al. |
| 6,330,551 B1 * | 12/2001 | Burchetta et al. ............... 705/80 |
| 6,336,095 B1 | 1/2002 | Rosen |
| 6,766,307 B1 | 7/2004 | Israel et al. |
| 6,801,900 B1 | 10/2004 | Lloyd |
| 7,013,284 B2 | 3/2006 | Guyan et al. |
| 7,017,111 B1 | 3/2006 | Guyan et al. |
| 8,204,765 B2 * | 6/2012 | Kirsh et al. ....................... 705/4 |
| 8,335,702 B2 * | 12/2012 | Kirsh et al. ....................... 705/4 |

OTHER PUBLICATIONS

Cabin, Monitor and combat payor denials, May 7, 1992, The Brown University Long-Term Care Quality Letter, v4, n8, p. 3(4).*

(Continued)

*Primary Examiner* — Tran Nguyen
(74) *Attorney, Agent, or Firm* — CipherLaw

(57) ABSTRACT

A system and method for automating and standardizing an appeals process, facilitating both business-to-business (i.e., insurance companies to providers) and business-to-consumer (i.e., insurance companies to patients) relationships, and educating users on the healthcare industry and patient rights. The system and method provides automated and standardized electronic communication for any business with a regulated or contractual appeals or grievance process. In one application, the system and method provide electronic communication between patients, providers, and insurance plans; convenient access to an "anytime" appeals process; and an efficient follow-up and appeals status tracking. There are standardized forms for the appeal, and the provider appeal format is compatible with current billing forms. The system includes an on-line web site with the ability to manage "behind the scenes" the overall appeals process, including data collection, data management, correspondence generation, process status tracking, and individualized client accounts.

22 Claims, 17 Drawing Sheets

(56) References Cited

OTHER PUBLICATIONS

PR Newswire, "Cardiff Software Announces TELEform MediClaim Module," May 1, 1998, p. 1.

J. Jesitus, "Staking their claims," Managed Healthcare, p. 16-22, Apr. 1999.

Cabin, "Monitor and combat payor denials," May 7, 1992, The Brown University Long-Term Care Quality Letter, v4, n8, p. 3(4).

* cited by examiner

Manual Appeal Entry Routine

Appeal Submission Routine

Escalate Appeal Routine

Fax Additional Documentation Routine

Upload Appeal(s) Routine

EappealSolutions.com

Figure 14    232

Update My Appeals

The denial was upheld by the insurance plan.

Status: Pending    Level: First Level Appeal
Determination: No Determination

- Diagnostic procedure results
- Consultation Reports
- Hospital Chart Records

☐ Escalate this appeal to the next level of appeal.
☐ Do NOT escalate this appeal and close.

Privacy Statement | Legal Statement

Figure 15    234

Appeal Header Information

Contact Name: Sally Smith    Entity Filing Appeal:

Insurance Plan or Program
Name:
Address:
City:
State: Select a State
Federal Tax ID Number:

Explanation of Payment
Claim Number: 59123456789
Denial Type: Eligibility
Doctor ID:
Denial Code: DC
Denial Reason: Paid per contract

Facility Where Services were Rendered
State: Select a State
Zip:
Fax: (   )

Physician's Supplier's Information
Name:
Address:
City:
Telephone: (   )

* Required fields from HCFA 1500

Privacy Statement | Legal Statement

Additional Information

Enter any additional information or comments applicable to this appeal:

Figure 19 400

Your Appeal is Complete

Thank you for using eAppealSolutions to file your appeal. We will forward this appeal directly to the health insurance plan.

eAppealSolutions will track this appeal against the applicable timeframes and update you via email if there are any updates to the appeal. If you receive any response related to this appeal, please update the information in the my eAppealSolutions area. Your eAppealSolutions appeal number is listed below:

Appeal Number: 12345

Figure 20 600

[Appeal Number 1234]                                                                 [Appeal Number 1234]

August 10, 2000                                                                

FAX COVER SHEET

TO:
eAppealSolutions
Appeal Number 12345
Tel: (877) 463-0000
Fax: (305) 555-5555

FROM:
Sally Smith
Dr. John Smith
1122 Main Street
Miami, Florida 33133
Tel: (305) 860-0000
Fax: (305) 999-9999

RE: Additional Information for eAppealSolutions Appeal Number 1234

Number of Pages:      (including cover)

Comments:

eAppealSolutions
c/o Dr. John Smith

This Fax Transmittal shall only include additional information for Appeal 1234 ONLY

SYSTEM AND METHOD FOR STANDARDIZED AND AUTOMATED APPEALS PROCESS

CROSS-REFERENCE TO RELATED APPLICATIONS

This application is a continuation of and hereby claims priority to U.S. application Ser. No. 13/473,498, filed on May 16, 2012, which is a continuation of and claims priority to U.S. application Ser. No. 09/784,045, filed on Feb. 16, 2001, now U.S. Pat. No. 8,204,765, which is a non-provisional of and claims priority to U.S. Provisional Application Ser. No. 60/183,336, filed on Feb. 18, 2000, each of which are entitled "System and Method for Standardized and Automated Appeals Process," the contents of each of which are hereby incorporated by reference.

TECHNICAL FIELD

The present invention relates generally to a system and method for a standardized and automated appeals process. More particularly, the invention relates to a system and method for standardized and automated appeals or a dispute resolution process over a distributed network for regulated or contractual denials of certain benefits.

BACKGROUND OF THE INVENTION

Many businesses or industries have regulated or contractual appeals or grievance process allowing a user or a customer the opportunity to challenge the denial of a service or benefit. These appeals or grievance processes uniformly suffer from lack of automation and standardization. Instead, the appeal or dispute is submitted in paper form and without the benefit of standardized nomenclature or data format.

One example is medical insurance coverage plans. State and federal laws, as well as contractual provisions, allow both those insured (consumers) and healthcare providers (doctors, dentists, chiropractors, etc.) the right to file appeals with health insurance companies when the health insurer has denied a request or benefit. A consumer appeal arises when a request for approval to receive medical treatment is denied or a claim is not paid correctly. A healthcare provider may file an appeal when an insurer has not properly paid for a particular service rendered. Upon receipt of a written appeal or grievance, an insurance plan must review the appeal and make a decision regarding its approval or denial.

Why Providers Appeal

In a typical denial of a request for medical services, a patient and a physician determine the need for a medical service and the physician contacts the healthcare insurer to request pre-authorization for that service. After the healthcare provider has treated the patient, a claim for payment of those services is submitted to the health care payer. The claim must be submitted on the appropriate claims submission form; for providers that is a HCFA 1500 Claim Form, and for facilities it is a UB92 Claim Form. Insurance companies require that a "clean" claim form be submitted. That means that the forms must include all of the following information:
  Patient Identification
  Patient Demographics (i.e., address)
  Diagnosis
  Dates of Service
  Procedures or Services Provided Utilizing Standardized Codes and Descriptions (i.e., CPT codes)
  "Units" of Service (i.e., how many times the patient was seen in the office) Billing Amount(s)

If the claim does not meet the specified criteria, it is denied or a partial payment may be made to the provider. The provider receives an explanation of payment (EOP) outlining what was paid on the claim or the reasons the claim was denied or only partially paid. A description of the provider's right to appeal may be included in the correspondence from the insurance company. While the patient does not usually receive notification that a doctor's request for payment for a medical service has been denied, she or he is often billed when the insurance company does not pay. Most of the time claims are denied because either information is missing from the claim form or the provider contract is loaded incorrectly into the insurance company database.

How Providers Appeal

A provider may appeal on behalf of the member. A provider may also appeal claim payment denial or payment reduction. If a provider is appealing on behalf of a member for a medical service request denial, the process is the same as a member appeal. Most often, though, an appeal by a provider is triggered by receipt of a confusing explanation of payment benefit, or EOP. An EOP is sent to the provider by the insurer explaining the payment(s) for submitted claims. The EOP is coded by the insurer's claims processing system and lists the reason(s) for the claims denial; unfortunately, the codes are not standardized and are often unclear.

Most providers are not aware of their right to file an appeal. Those that do will often initiate an appeal by contacting the health care payer Claims Department or Provider Services Department. Physicians have the right to appeal if and when:
  The appeal is on behalf of the patient for any reason.
  The plan has denied the patient coverage for a service based on medical necessity.
  A medical service claim payment has been denied.
  A medical service claim payment is partially denied and/or paid incorrectly.

Why Patients Appeal

Patients generally submit a health insurance appeal for one of two reasons: denial of a request for a medical service or a claims payment denial. Say that the patient and physician determine the need for a medical service. The physician contacts the health care payer to request pre-authorization for that service. The physician provides the plan with all necessary demographic and clinical information justifying the requested service. Upon receipt, the insurer initiates a prospective review (a pre-certification utilization review) to determine if the medical service request will be approved. The following questions are most often considered:
  Is the patient a member of the Health insurer?
  Is the requested service covered under the patient's benefit plan?
  Is the patient within the benefit limitations?
  Is the provider of the requested service within the plan's network?
  Is the requested service medically necessary?

If the response to any of these inquiries is "no," the medical services request is denied. The insurance company must send notification of the denial to the patient and the requesting provider and informs the member that she or he has the right to appeal the decision. The health insurer is required by law to outline the appeal process.

It is important to realize that one of the most common reasons a medical service request is denied is because the insurer concludes that the request is "not medically necessary," which usually means that the physician and/or patient has not provided all of the important clinical information.

This is critical, since all health insurers are required to utilize nationally recognized standards of clinical care and criteria to guide their clinical decision-making. A medical director, who must be a licensed physician, reviews all medical service request denials that are based on "medical necessity." When a patient or provider appeal a medical service request denial and provides additional or missing information, about 80% of the time the denial is overturned and the request for service approved.

The majority of consumer healthcare appeals are triggered when patients receive a bill from their providers, who have not received reimbursement from the insurance company for services already provided. This is called a medical service claims payment denial. Providers are not legally allowed to bill members for more than the co-payment or deductible—a situation also known as balance billing—but often correspondence from a collection agency is the first notification for members that the insurance company has denied their physicians' service claim. Even if the insurance company eventually pays the claim, patients are still dunned because there is no communication between patients, providers (who have often sold their collectibles), insurance companies and, all too often, the collection agencies.

How Patients Appeal

A member initiates an appeal by contacting the health insurer. Healthcare insurers require written notification, even if the patient calls and speaks to a Member Services Representative. Some plans have a structured appeal form while others request a free-text letter. Regardless, by law all insurance companies must have in place a process for appeals, which requires a decision to an appeal within a time certain depending upon state regulation. The time for response begins to run when the insurer has received a "complete file." The eAppealSolutions' eZappeal form was designed to capture all necessary information. Therefore, a "complete file" is submitted the first time.

The appeal determination is made and the member is notified of the decision. If the denial is overturned, the member is allowed to receive the requested service(s) and/or the provider is paid. If the appeal is upheld or affirmed, the member is notified of the procedures for a secondary review. The third and final level of appeal includes external reviewers.

SUMMARY OF THE INVENTION

The invention generally relates to systems and methods for standardized and automated appeals and grievance procedures.

The invention provides a system and method that automates and standardizes the appeals process, facilitating insurance companies to providers and insurance companies to patients relationships. In addition, the invention educates users about industry and user rights. The invention can be utilized for a wide range of regulated or contractual appeals or grievance process including medical insurance plans, workers' compensation cases, credit card disputes, warranty claims, long term care, and personal injury protection. It can be used in any industry or business environment where the consumer or beneficiary has a right to challenge the denial of a contracted benefit.

According to one embodiment (i.e., the health care industry), the invention provides a method of electronic communication between patients, providers, and insurance plans; convenient access to an "anytime" appeals process; and an efficient method for follow-up and appeals status tracking. The invention uses technology to convert paper documents into a standardized electronic format. It accepts data from various incompatible and divergent systems and converts it into a universally recognized format.

The customer—patient or provider—is in control of the process. There are standardized forms for the appeal, and the provider appeal format can be compatible with current billing forms. The invention includes the ability to manage "behind the scenes" the overall appeals process including data collection, data and documentation management, correspondence generation, process status tracking, and individualized client accounts.

The objects, features, and advantages of the present invention will become readily apparent from the detailed description thereof.

BRIEF DESCRIPTION OF THE DRAWINGS

FIG. 14 illustrates an update screen according to one embodiment of the invention.

FIG. 15 illustrates a new appeal screen according to one embodiment of the invention.

FIG. 16 illustrates an appeal patient information screen according to one embodiment of the invention.

FIG. 17 illustrates an appealable services screen according to one embodiment of the invention.

FIG. 18 illustrates an additional information screen according to one embodiment of the invention.

FIG. 19 illustrates an appeal complete screen according to one embodiment of the invention.

FIG. 20 illustrates a fax screen according to one embodiment of the invention.

DETAILED DESCRIPTION OF THE INVENTION

Figure 1:
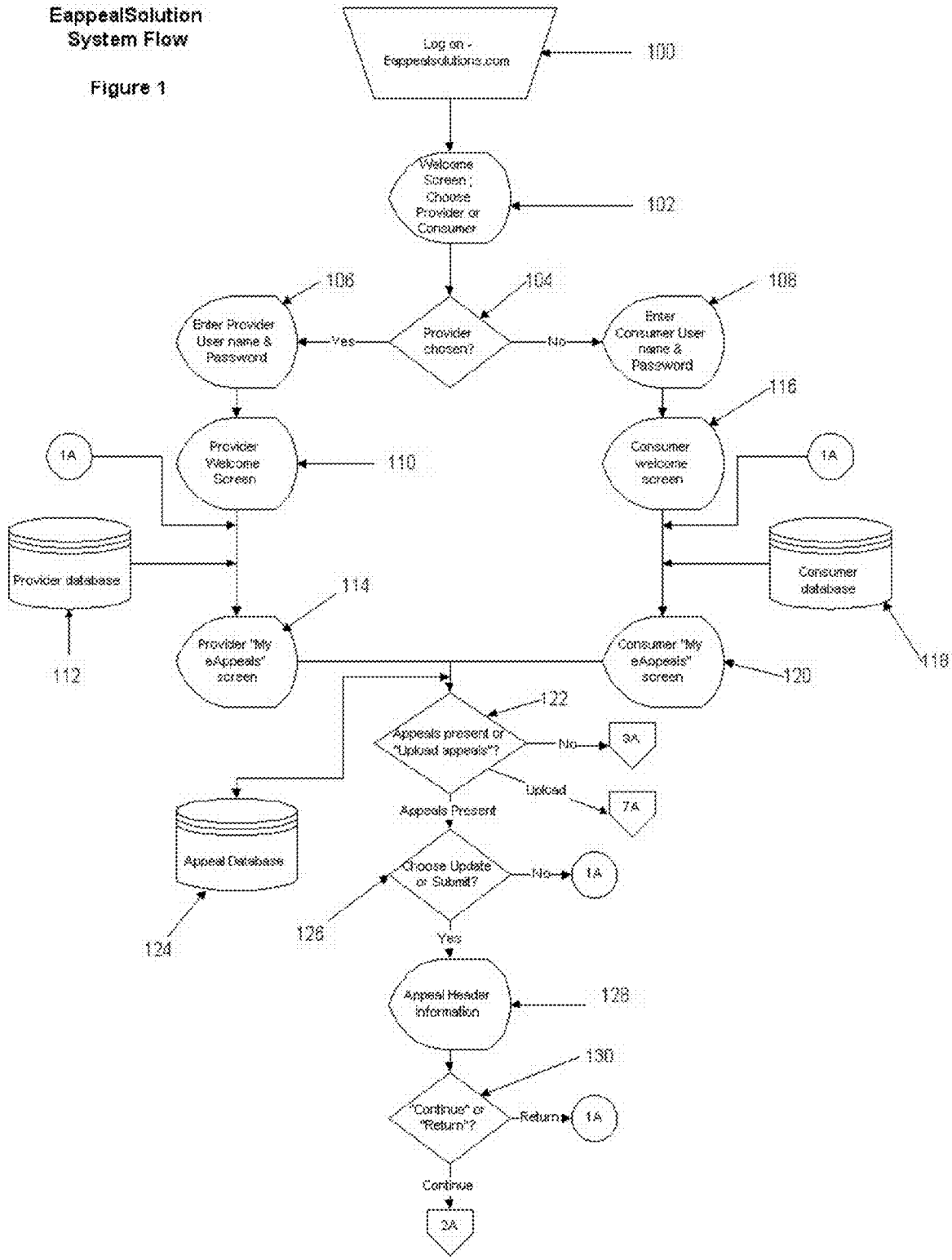
FIG. 1 illustrates the system flow according to one embodiment of the invention.

The present invention can automate and standardize the confusing appeals process with an automated service targeting both consumers and businesses. Approximately ten percent of the 4.4 billion healthcare claims filed each year can result in a consumer appeal, and between 12 and 15 percent of all commercial health insurance claims filed by providers are denied or paid less than expected. Although the present invention works using any transaction medium, the "connectivity" of the Internet will reduce administrative expenses and increase consumers' control over their appeal rights.

One embodiment provides a method of electronic communication between patients, providers and insurance plans a convenient access to an "anytime" appeals process, and an efficient method for follow-up and appeal status tracking. According to one embodiment, standardized forms are used for the appeal, and the provider appeal format is compatible with current billing forms.

Another embodiment provides an automated system to manage "behind the scenes" the overall appeals process, including data collection, data management, correspondence generation, process status tracking, and individualized client accounts.

The present invention will facilitate both business-to-business (i.e., insurance companies to providers) and business-to-consumer (i.e., insurance companies to patients) relationships. A major benefit of the invention is connectivity: all of the segments of the appeals process are currently interacting, but ineffectively and manually. By integrating the appeals process with an automated computer connectivity system which is a familiar, comfortable tool already being used to research healthcare information technology can now be conveniently accessed for information about health insurance and the appeals process.

Automating the appeals process will empower patients, providing an easy and efficient means of filing appeals with a health insurer reduces "red tape", and enables a greater number of members to challenge healthcare denials. The automated appeals system can provide education about the overall appeals process, including such topics as pre-certification review and benefit coverage. Certain data can be requested from the member, who will be able to review the steps taken in the claims analysis process. Because one of the most common reasons for medical service request denials is "not medically necessary" (most often the result of the physician and/or patient not providing all of the necessary clinical information), patients will be able to realize what triggered the denial—and then remedy it. The ease of 24-hour access to tracking and monitoring the appeals process is an additional benefit, because the major complaint about filing appeals is the number of telephone calls and the amount of documentation sent back and forth between patient, physician, healthcare insurer, broker, etc. before the problem is solved. The automated system can also automatically generate correspondence that informs a collection agency about the initiation of the appeals process for patients who are being harassed by a collection agency—which happens when providers aren't paid by the insurance company and "sell" the receivable amounts they are not able to collect.

The automated appeals system can benefit providers as well. Health care providers typically carry 90 to 120 days of receivables and lose a significant amount of money on non-collectible or denied claims because of the administrative burden and expense of filing an appeal. Most providers do not even know how to effectively appeal a payment denial and simply resubmit the bill. However, with the automated appeals system, providers will be able to automatically track and monitor the appeals process and improve their cash flow. Most provider groups have at least one full-time staff member for billing and appeals issues, and this individual spends a great deal of time calling about and following up on appeals. The automated appeals system will reduce that burden. Similar administrative tasks also fall on employer groups and health insurance brokerage agencies, which are often called upon to facilitate the appeals process.

Insurance companies can also benefit because the automated appeals system and process provides an excellent business opportunity. The automated appeals system can provide data collection, tracking and processing, and can interface with the insurance companies' computer systems. The establishment of an appeals standard in the industry is the single most important benefit to the insurance companies. And not only will reducing the current inefficiencies decrease administrative costs, but relationships with both members and providers can be enhanced. In addition, the healthcare companies can track and monitor the flow of appeals for their regulatory bodies, which use that information to monitor the quality of patient care provided. Currently, many insurance companies do not have a computerized appeals database and are tracking them manually. With the automated appeals system, insurance companies have an outsourcing opportunity that can automate the method of accepting and processing appeals. The automated appeals system can follow the standard process of claims adjudication.

The automated appeals system uses electronic connections to link providers, patients and payers so that information can be delivered accurately and provided in a timely manner. It uses the application of computer communications and data processing capacity to automate the entry, transmission, processing and storage of information. The automated appeals system reduces administrative burden, letting doctors and insurance providers focus on the health of and relationship with the patient. This system can be utilized by both providers and regulators to reduce fraud. The automated appeals system's technology offers regulators, corporations and consumers the capability to interact with each other digitally—convenient, traceable and monitored regularly. Scam artists won't have the opportunity to hide under a mound of paperwork or delays of red tape.

The automated appeals systems virtual office can include a computer access system designed for use by the customer. There are eight distinct customer groups that are targeted to use the automated appeals system: (1) patients, (2) employer groups, (3) insurance brokers, (4) healthcare providers, (5) medical management software organizations, (6) insurance companies, (7) claims clearinghouses, and (8) consumer groups such as AARP and disease support organizations. Each of these groups will utilize the web site in similar fashion (filing and tracking appeals) and be directed to their individual application through registration and log on screens.

The goal of the web site is to motivate the user to automate his/her appeals process and interact with the site. The automated appeals system home page will establish a strong brand identity while directing the user to this valuable service and healthcare information. From here, the user learns what the automated appeals system does and is presented with logical navigation.

In order to personalize the application for each user and maintain accurate, standard information, it is preferred that a user registers before filing an appeal.

One embodiment of the invention will now be detailed with reference to the flowcharts shown in the figures. The following descriptive narratives follow the flowchart included below and provide for full explanation of the system flow and function. The invention preferably provides for access to the functions of the system via secured remote connections.

FIG. 1-100

Represents the standard Internet function of gaining access to a Web Site, presented here as EAPPEALSOLUTIONS.COM.

FIG. 1-102

Figure 9:
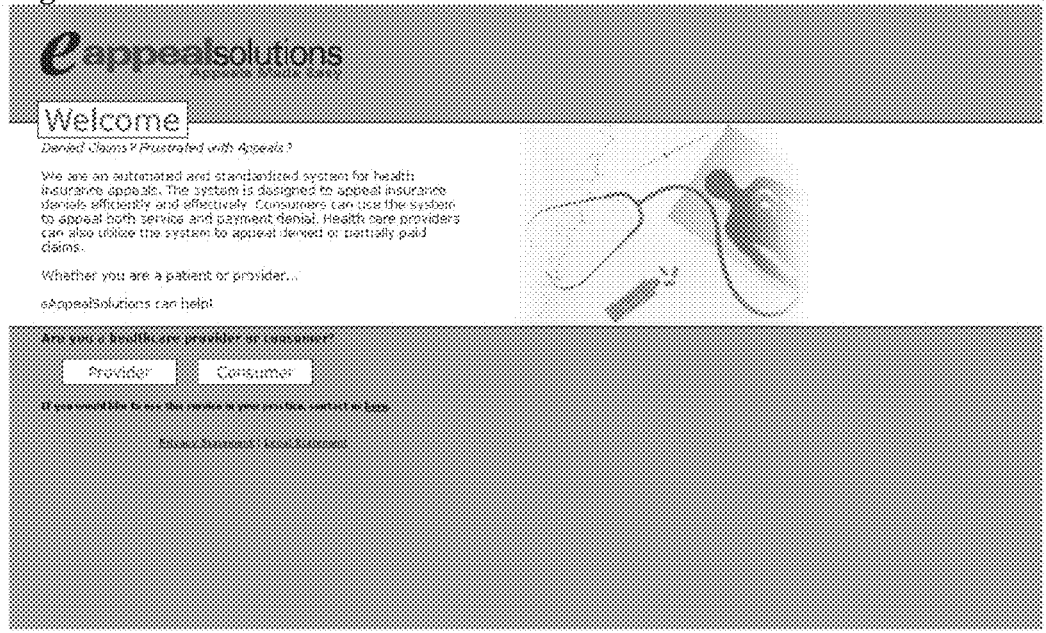
FIG. 9 illustrates a welcome screen according to one embodiment of the invention.

This web page is presented as the opening page from the web address EAPPEALSOLUTIONS.COM as demonstrated in FIG. 9 and shown in welcome screen 220.

FIG. 1-104

Represents the choice selection from welcome screen 220 as shown in FIG. 9 as either "Provider" or "Consumer".

FIG. 1-106

Figure 10:
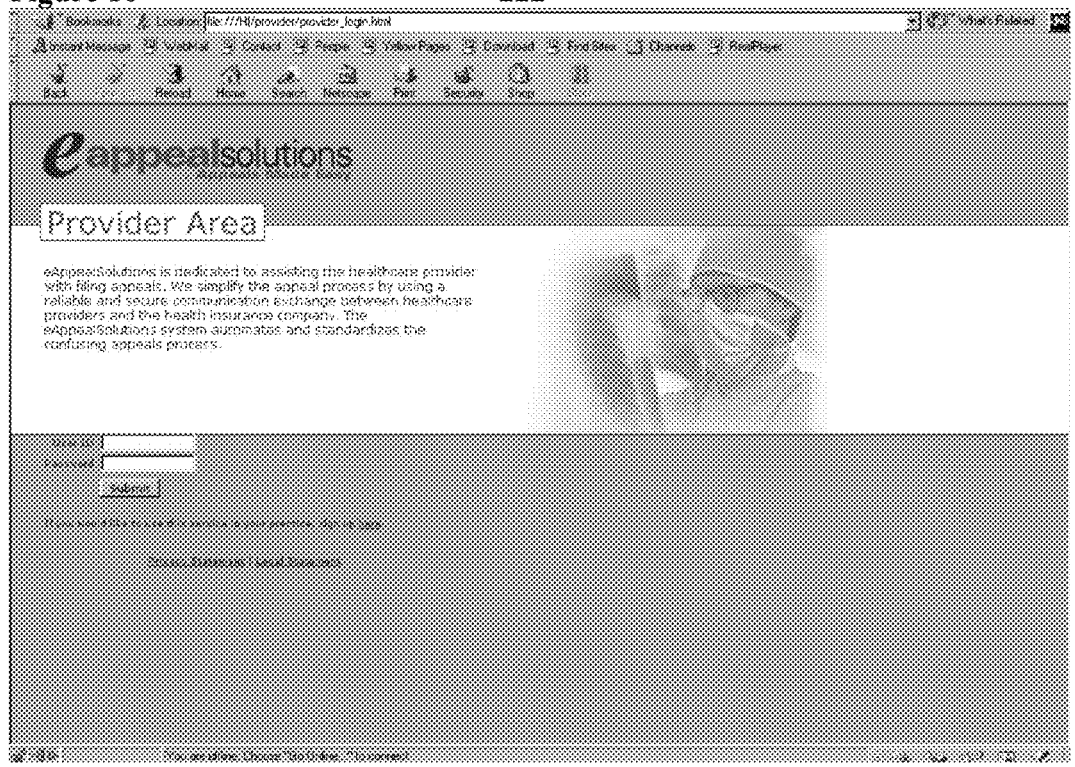
FIG. 10 illustrates a provider screen according to one embodiment of the invention.

This is the web page presented when the selection from welcome screen 220 is executed as "Provider" as demonstrated by FIG. 10 and provider screen 222 (similar to consumer screen 224). Only subscribing health care providers who have been issued a unique profile consisting of a user identification code and a password may proceed beyond this point.

FIG. 1-108

Figure 11:
FIG. 11 illustrates a consumer screen according to one embodiment of the invention.

This is the web page presented when the selection from welcome screen 220 is executed as "Consumer" as demonstrated by FIG. 11 and consumer screen 224. Only subscribing consumers who have been issued a unique profile consisting of a user identification code and a password may proceed beyond this point.

FIG. 1-110

Figure 12A:
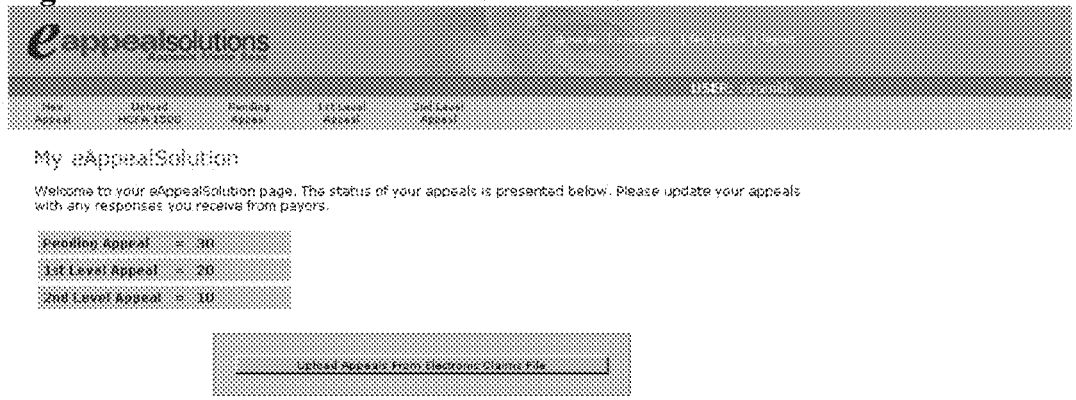
FIG. 12A illustrates a provider screen according to one embodiment of the invention.

This portion of the web page as demonstrated in FIG. 12A and provider screen 226, is presented when a subscribing provider has presented the correct security profile as presented in the description for FIG. 1-106.

FIG. 1-112

The provider databases 112 contain all demographic and detail data for all appeals submitted by the subscriber. These records are unique to each subscriber profile and are not available to any other subscriber. The retrieval of appeal data is performed during the presentation of the provider screen 226.

FIG. 1-114

The bottom portion of provider screen 226 is completed by aggregating the appeals specific to this subscribing provider into summary batches labeled according to the status of the data as demonstrated in FIG. 12A.

FIG. 1-116

This portion of the web page is presented when a subscribing consumer has presented the correct security profile as presented in the description for FIG. 1-108. Each subsequent web screen follows the methodology of the provider flow, excepting the inherent regulatory differences between provider and consumer appeals in the appeal procedure.

FIG. 1-118

The consumer databases 118 contain all demographic and detail data for all appeals submitted by the subscriber. These records are unique to each subscriber profile and are not available to any other subscriber. The retrieval of appeal data is performed during the presentation of the FIG. 1-116.

FIG. 1-120

Figure 12B:
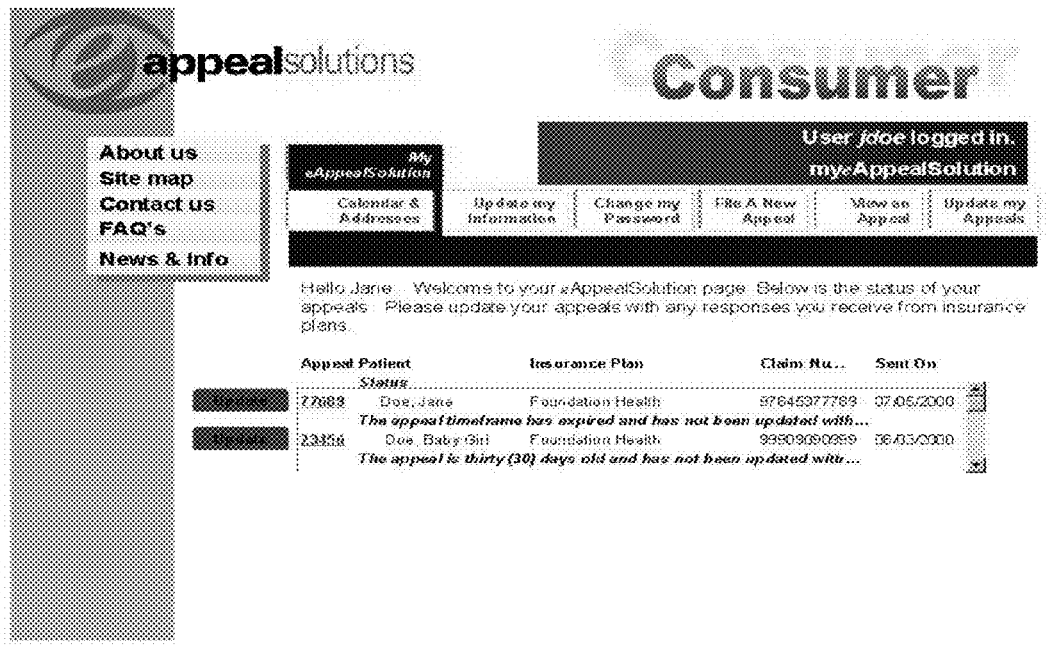
FIG. 12B illustrates a consumer screen according to one embodiment of the invention.

The completion of consumer screen 228 is accomplished by identifying the appeals specific to this subscriber and displaying those claims at the header level as demonstrated in FIG. 12B.

FIG. 1-122

The selection choice is presented of provider screen 226 for subscribing providers or consumer screen 228 for subscribing consumers. If appeal data does not exist for the subscriber, the aggregate status lines discussed in FIG. 1-114 and FIG. 1-120 will indicate zero (0). There are now two options available.

Figure 21:
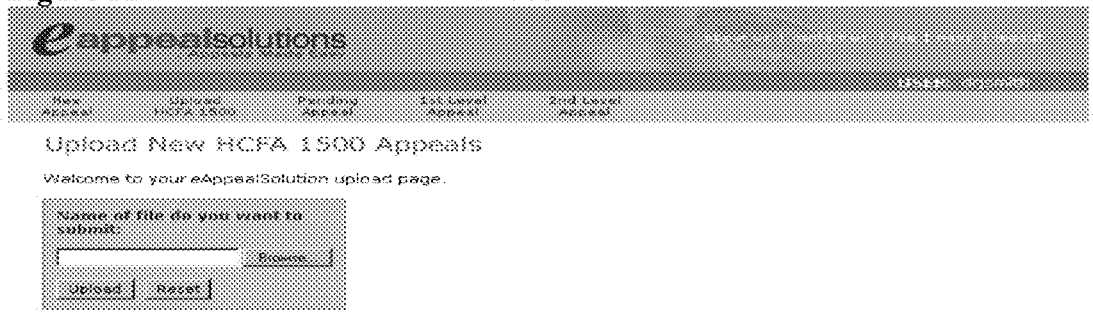
FIG. 21 illustrates an upload screen according to one embodiment of the invention.

Selection of the "New Appeal" option from the top line of the web page presents new appeal screen 234 shown in FIG. 15 with no data present to begin the manual entry of appeal information. If the "Upload" option is selected by clicking the labeled button, upload screen 700 as shown in FIG. 21 is presented. Full description of this selection and process is presented as FIG. 7-210.

FIG. 1-124

Data for the subscriber is located with the appeals database 124 as discussed above. If data does exist, the detail records for each appeal are available for maintenance, relative to their status and the selection of the subscriber and presented on the following screen, data screen 230 referenced by FIG. 1-126 and demonstrated by FIG. 13.

FIG. 1-126

Selecting the "radio button" for a specific detail line and then selecting the button labeled "Update My Appeals" will provide the first of a series of screens allowing the maintenance of the detail data for the selected appeal as described below.

FIG. 1-128

The Appeal Header Information is presented in two (2) screens, update screen 232 and new appeal screen 234 as demonstrated by FIG. 14 and 15. Update screen 232 provides for consolidated information regarding the key elements of the appeal data, documentation, and appeal status. New appeal screen 234 allows for the maintenance of the illustrated data elements. Full entry and correction of any or all data elements is allowed up to the time the appeal is submitted to the payer. After submission, all data for that appeal is marked as read only and cannot be changed.

FIG. 1-130

The choice of continuing with the appeal maintenance or returning to the data screen 230 is also presented. By selecting the "Return" button, the subscriber is returned to the appropriate aggregate screen as demonstrated in FIG. 12A and 12B. Whether "Return", "Continue", or any other legitimate selection as presented by this screen is chosen, the data entered thus far is written to the database and a unique appeal number will be assigned associating this data with the subscriber profile.

FIG. 2-132

Figure 7:
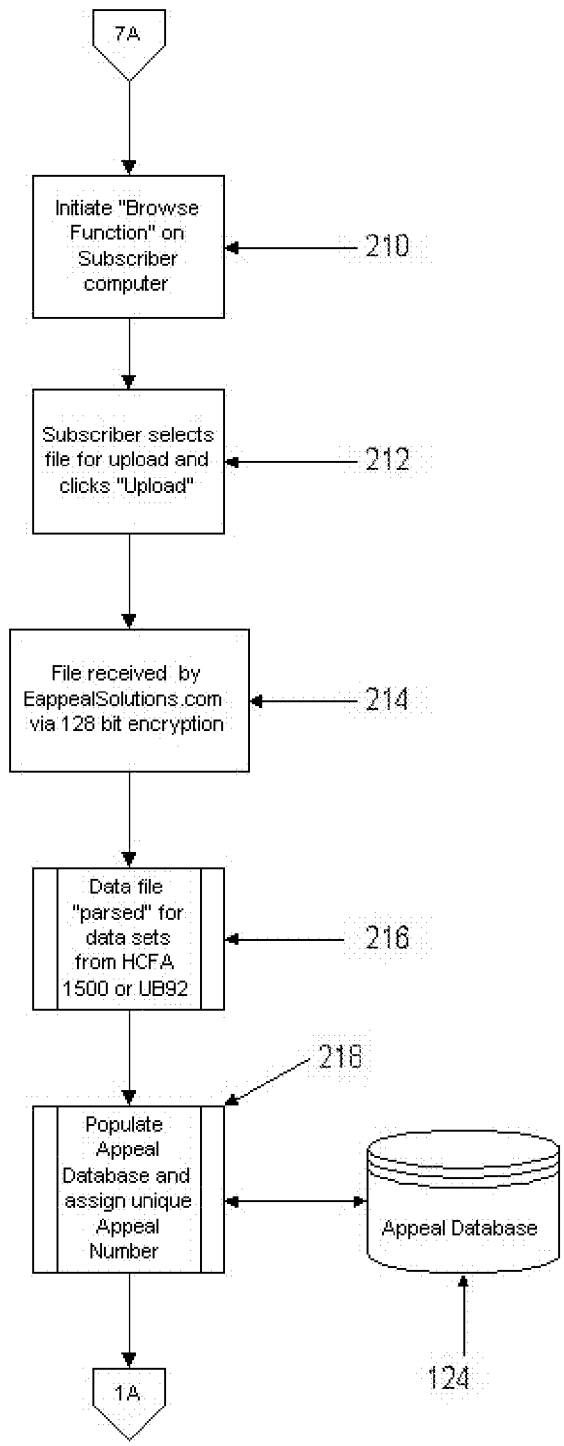
FIG. 7 illustrates an upload appeal(s) routine according to one embodiment of the invention.
Figures 16, 17:
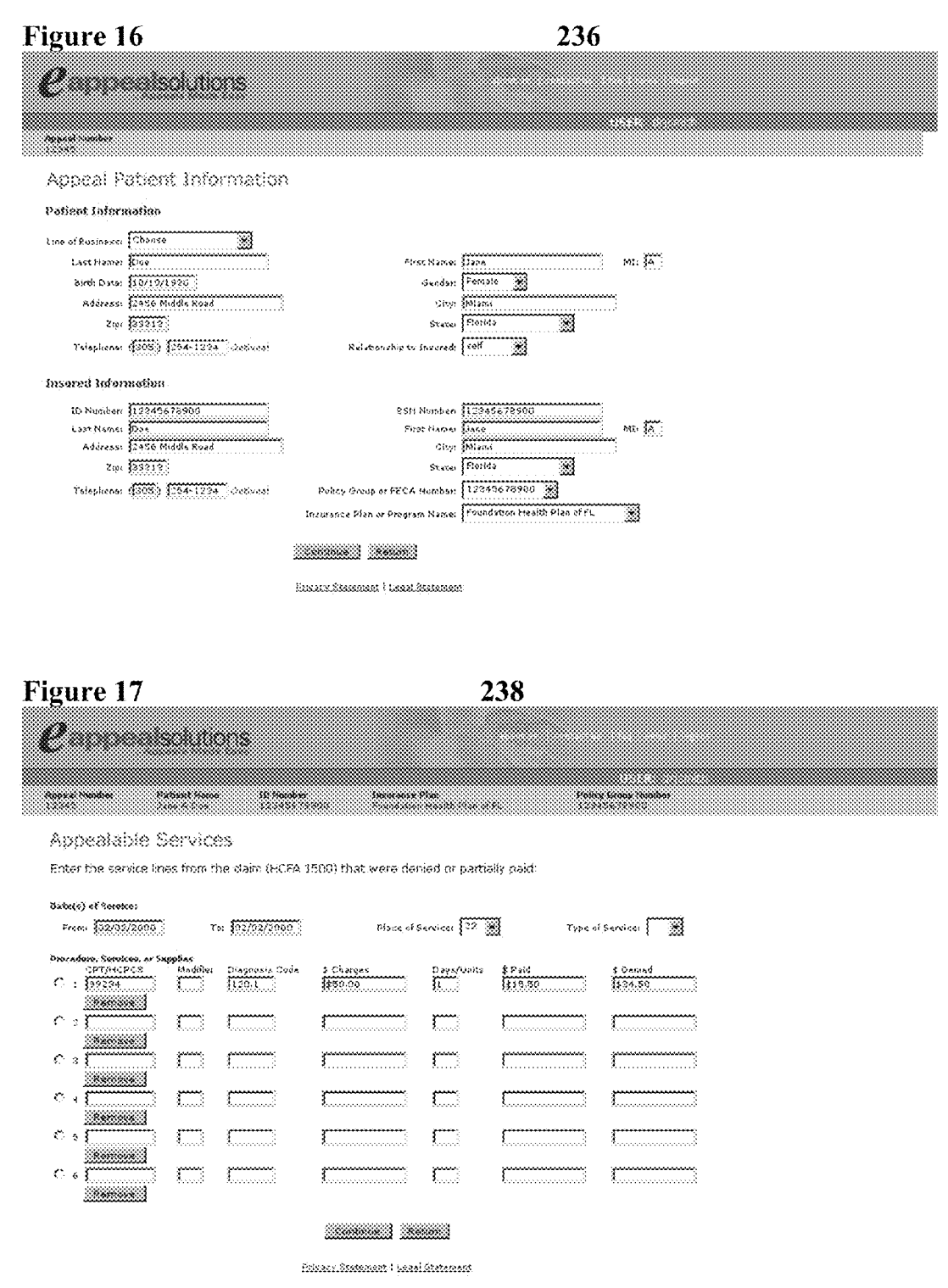

The Appeal Patient Information screen 236 is presented when the "Continue" choice is selected from FIG. 1-130 as demonstrated in FIG. 16. As above, all data elements are available for editing or additional entry until the appeal is submitted. Data elements presented on this, and all other screens, labeled with red descriptors are elements of the appeal record directly obtained by programmatic "parsing" routines as a result of the electronic upload (FIG. 7-210). When this screen is presented for manually entered appeals, these data elements are labeled so they will relate to the standard HCFA 1500, NSF ver 2.0 or 3.0, UB92, or ANSII format of standardized data forms serving the health care industry.

FIG. 2-134

The choice of continuing with the appeal maintenance or returning to the data screen 230 is also presented on the previously noted screen. By selecting the "Return" button, the subscriber is returned to the appropriate aggregate screen as demonstrated in FIG. 12A and 12B. Whether "Return", "Continue", or any other legitimate selection as presented by this screen is chosen, the data entered thus far is written to the database and a unique appeal number will be assigned associating this data with the subscriber profile.

FIG. 2-136

The Appeal Service Line screen is presented upon selection of the "Continue" option from the previous screen. This section of the system provides the specific health care services performed by the provider or received by the consumer. The area of information is presented in two screens as demonstrated by FIG. 17 and 18. Appealable services screen 238 allows for the editing and additional entry of all data elements presented. Service line data may also be removed allowing for the subsequent appeal submission to present only those service lines appropriate for the appeal. Systematic calculation presents the dollar amount to be appealed for each service line, and additionally calculates total dollar amounts of all appropriate columns. When this maintenance function is continued, additional information screen 240 is displayed. This screen allows for the attachment of additional verifiable information to be submitted in support of, and be associated with the appeal. Information associated with the appeal may be entered on this screen, or is included as a part of the electronic upload process.

FIG. 2-138

Figure 2:
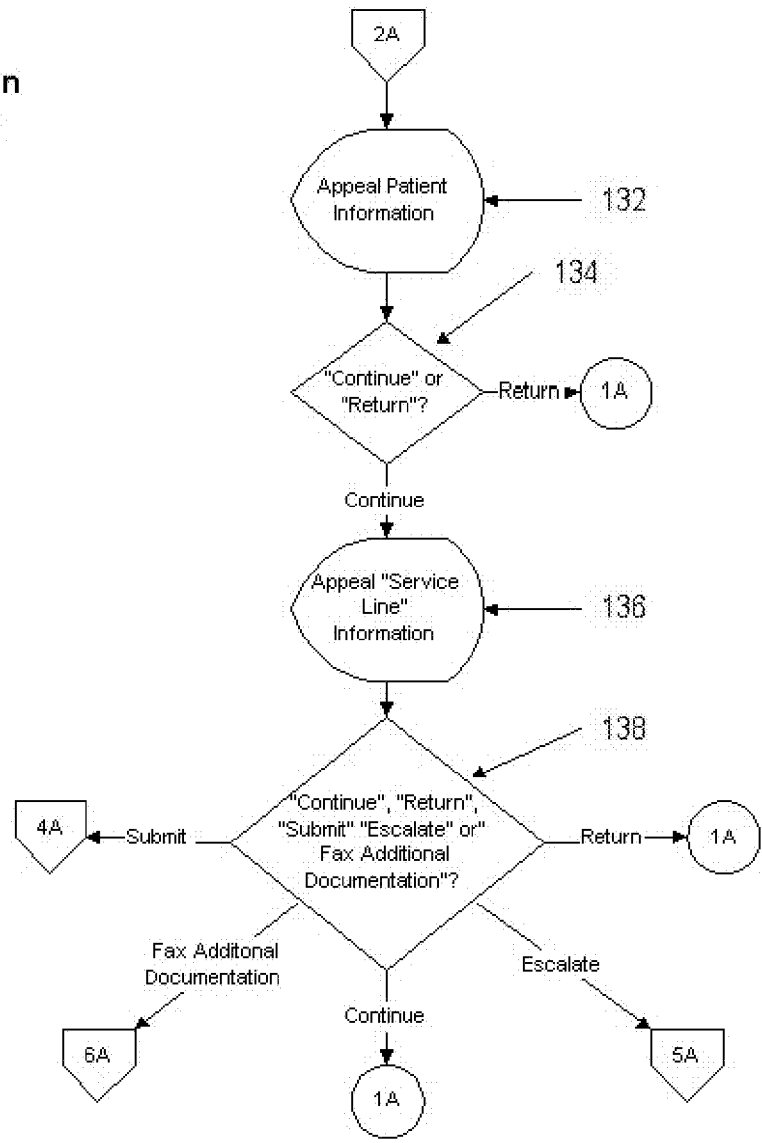
FIG. 2 is a continuation of the System Flow according to one embodiment of the invention.
Figure 3:
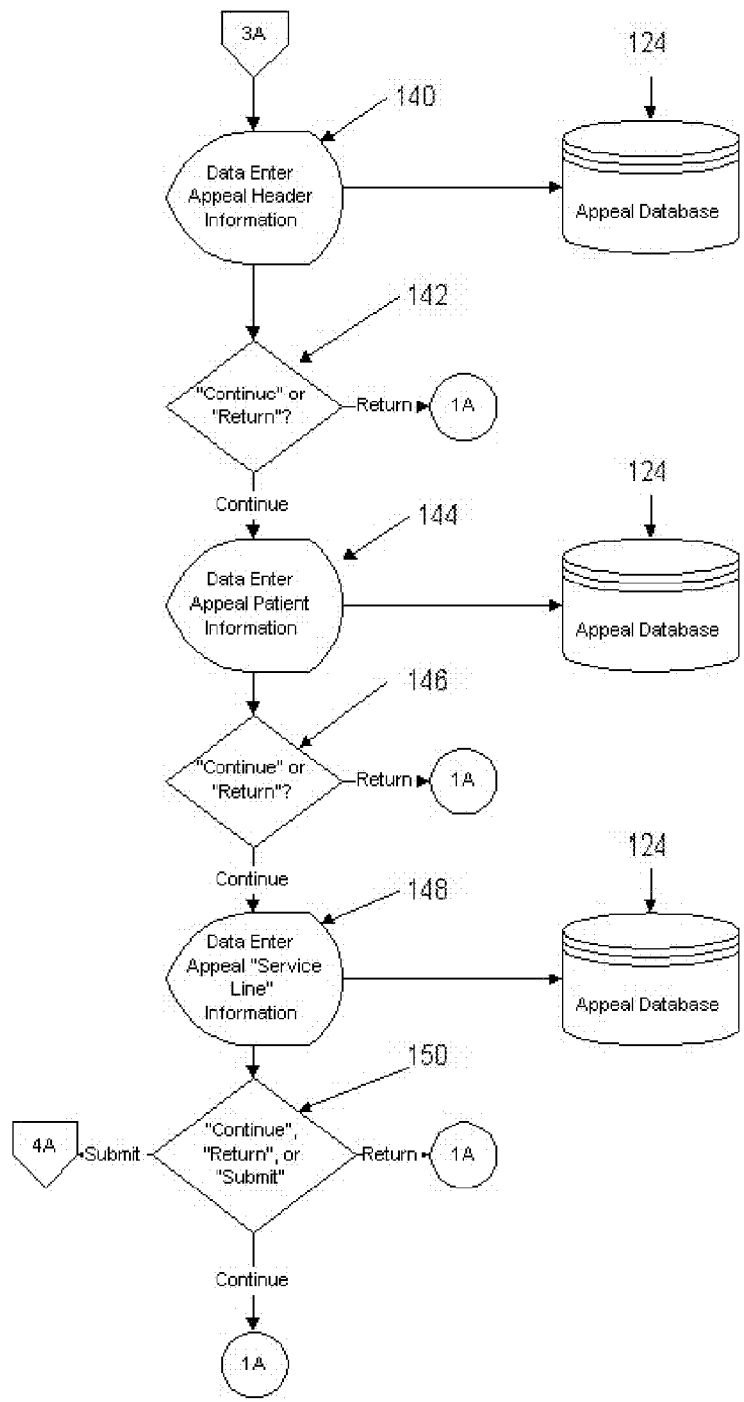
FIG. 3 illustrates a manual appeal entry routine according to one embodiment of the invention.

As a navigational function of FIG. 2-136 (additional information screen 240), multiple choices are presented. Both "Continue" and "Return" will function as described in multiple instances above with the exception that the choice "Continue" will return the subscriber back to data screen 230. Choosing the "Fax Additional Information" option will present fax screen 600 as shown in FIG. 20.

FIG. 3-140

The Appeal Header Information for manual entry is presented as demonstrated by new appeal screen 234 as shown in FIG. 15 with all data elements blank. This web screen allows for the entry of the illustrated data elements. Full entry and correction of any or all data elements is allowed up to the time the appeal is submitted to the payer. After submission, all data for that appeal is marked as "read only" and cannot be changed.

FIG. 3-142

The choice of continuing with the appeal maintenance or returning to the data screen 230 is also presented. By selecting the "Return" button, the subscriber is returned to the appropriate aggregate screen as demonstrated in FIG. 12A and 12B. Whether "Return", "Continue", or any other legitimate selection as presented by this screen is chosen, the data entered thus far is written to the database and a unique appeal number will be assigned associating this data with the subscriber profile.

FIG. 3-144

The Appeal Patient Information for manual entry screen 236 is presented when the "Continue" choice is selected from FIG. 1-130 as demonstrated in FIG. 16. As above, all data elements are available for entry.

FIG. 3-146

The choice of continuing with the appeal maintenance or returning to the data screen 230 is also presented on the previously noted screen. By selecting the "Return" button, the subscriber is returned to the appropriate aggregate screen as demonstrated in FIG. 12A and 12B. Whether "Return", "Continue", or any other legitimate selection as presented by this screen is chosen, the data entered thus far is written to the database and a unique appeal number will be assigned associating this data with the subscriber profile.

FIG. 3-148

The Appeal Service Line manual entry screen is presented upon selection of the "Continue" option from the previous screen. The area of information is presented in two screens as demonstrated by FIG. 17 and 18. Appealable services screen 238 allows for the entry of all data elements presented. Systematic calculation presents the dollar amount to be appealed for each service line and additionally calculates total dollar amounts of all appropriate columns. When this entry function is continued, additional information screen 240 is displayed. This screen allows for the entry of additional verifiable information to be associated with the appeal.

FIG. 3-150

As a navigational function of additional information screen 240, multiple choices are presented. Both "Continue" and "Return" will function as described in multiple instances above with the exception that the choice "Continue" will return the subscriber back to data screen 230. Choosing the "Fax Additional Information" option will present fax screen 600 as shown in FIG. 20 and is described in FIG. 6-198.

FIG. 4-152

Final review and submission of appeal information and documentation is demonstrated by FIG. 19 and is the appeal complete screen 400 presented when the "Submit" function is selected from FIG. 2-138.

FIG. 4-154

Allows for a copy of the appeal information to be printed by the subscriber for their office files. This print function includes the eZappeal letter, eZappeal form, and all associated documentation received from the subscribing provider.

FIG. 4-156

Figure 4:
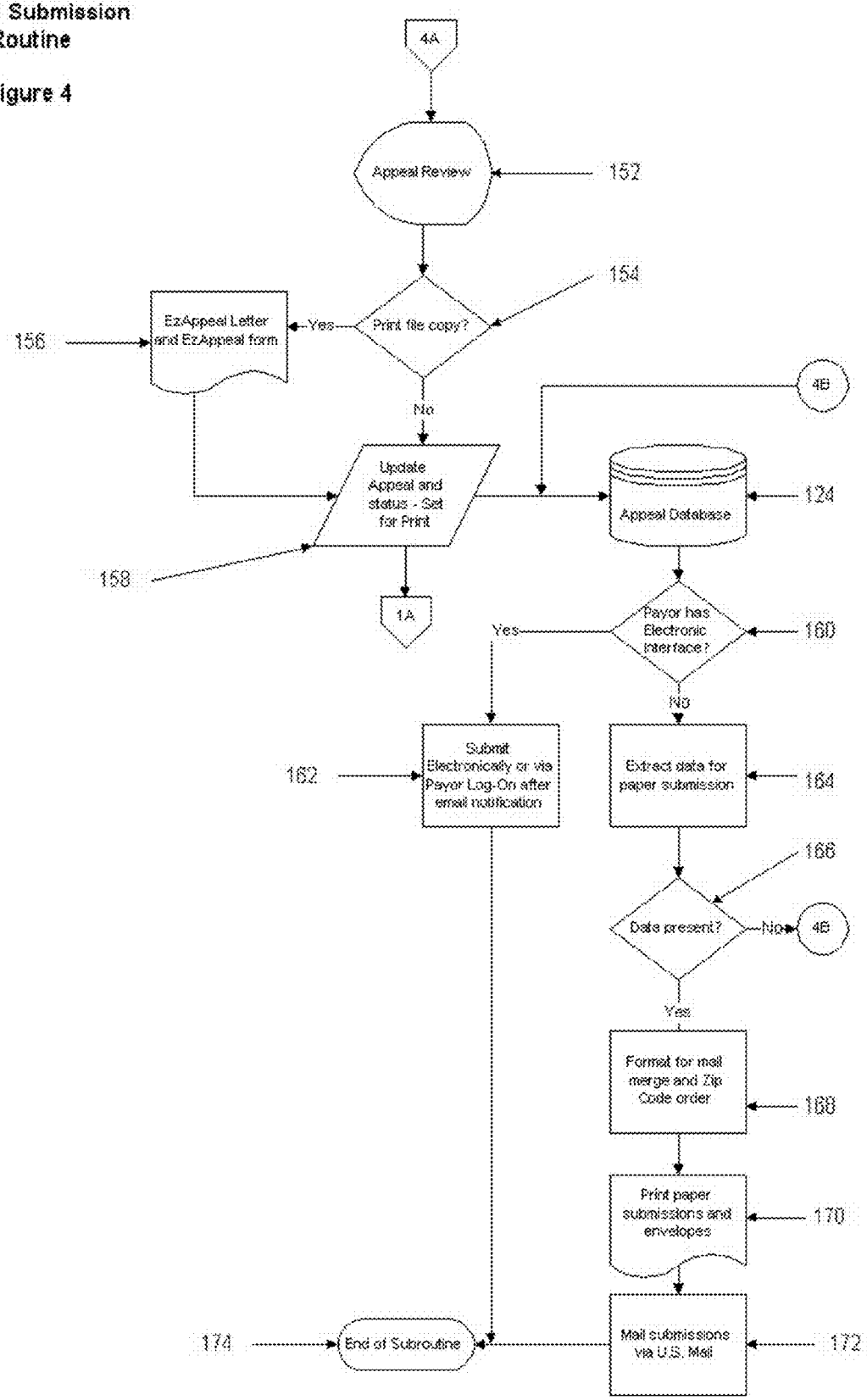
FIG. 4 illustrates an appeal submission routine according to one embodiment of the invention.

Represents the resulting printed copy of the eZappeal letter, eZappeal form, and all associated documentation received from the subscribing provider as indicated in FIG. 4-154 when selecting the print function.

FIG. 4-158

The system will update the appeals status from pending to first level submitted. Additionally the data is systematically marked as "read only" and can no longer be changed.

FIG. 4-160

Those payers with an electronic interface receive the electronic transmission of appeals and supporting documentation that have been submitted by subscribers. Payers receive only those appeals that are specific to that company.

FIG. 4-162

The payer is provided with the opportunity to receive the appeal and supporting documentation either through an electronic file to an electronic address designated by the payer or notification that new appeal information has been submitted directing the payer to its eAppealSolutions log-in screen.

FIG. 4-164

If the payer does not have an electronic interface as identified within the payer profile found in the appeals database, the appeal form and supporting documentation are sent to the payer in paper form.

FIG. 4-166

FIG. 4-166; 4-168; 4-170; and 4-172 all relate to the process to handle the transmission of paper appeals and supporting documentation when the payer does not have an electronic interface. FIG. 4-166 is the initial step in coordinating common payers for receipt of the manual submission of appeals and supporting documents.

FIG. 4-168

This step reflects the systems extraction of appropriate data elements necessary to produce U.S. Postal standard mail and the appropriate eZappeal and supporting appeal documents.

FIG. 4-170

The system coordinates the printing of the transmittal letter, the eZappeal form and any supporting documents onto appropriate stationary, prints properly addressed envelopes and manages the mailing process.

FIG. 4-172

The system confirms and tracks that the appeal and any supporting documents are mailed to the appropriate payer.

FIG. 4-174

Routine has been completed.

FIG. 5-176

After selecting the "Escalate" function from FIG. 2-138, the system identifies the regulatory agency appropriate for the appeal as identified in the appeal database 124 based upon the association between the state in which the health care service was performed and the recorded line of business (HMO, Commercial, Medicare, etc.) included in the appeal data.

FIG. 5-178

The appeal database is updated such that the escalated appeal is now marked as "read only" for all level 1 information, the status is upgraded to level 2 and the regulatory schedules for notifications and responses from all associated parties is initialized to reset.

FIG. 5-182

Figure 5:
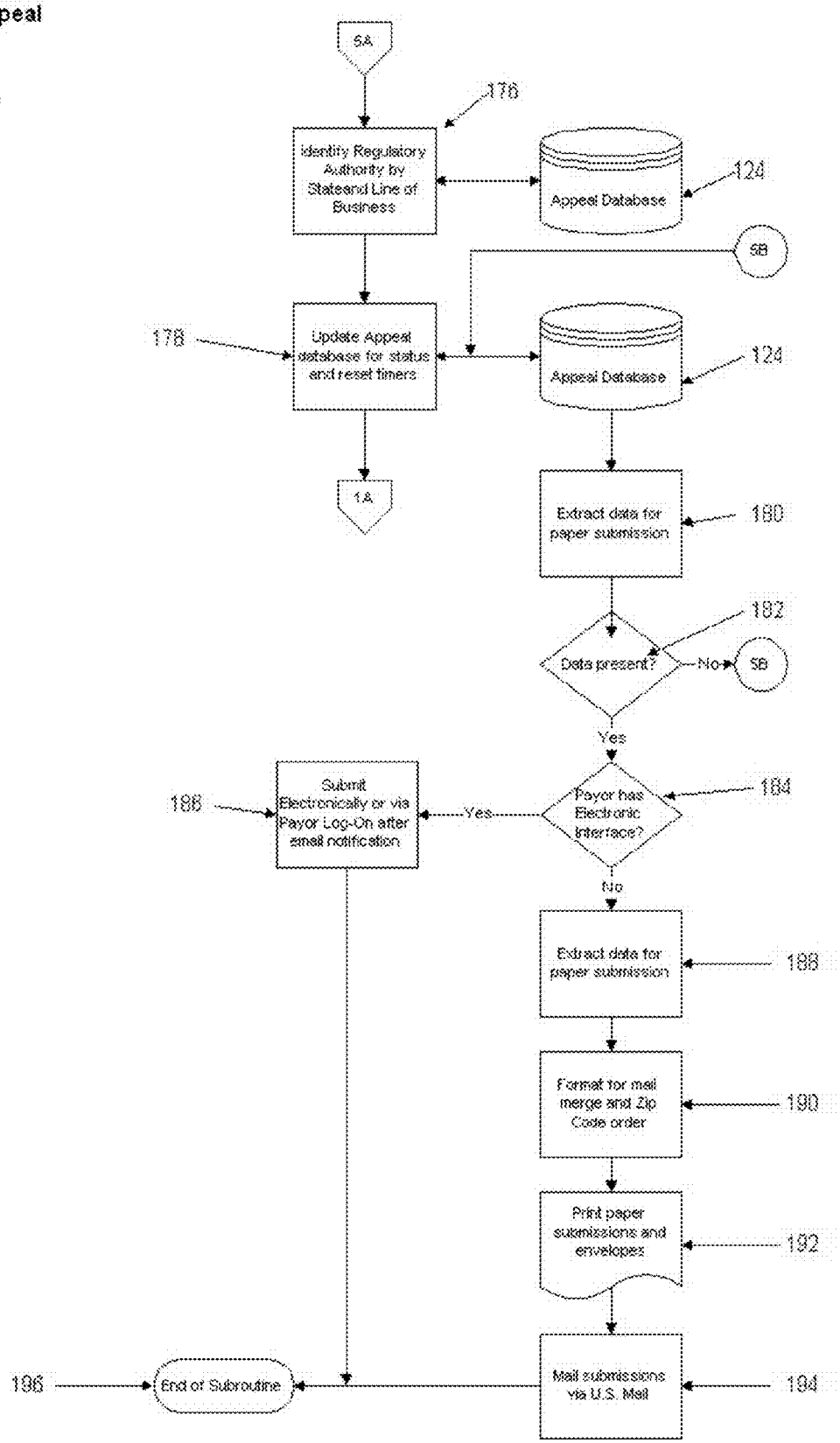
FIG. 5 illustrates the routine to escalate an appeal according to one embodiment of the invention.

FIG. 5-182; 5-190; 5-192; and 5-194 relate to the process to handle the transmission of paper appeals and supporting documentation. FIG. 5-182 is the initial step in coordinating common payers for receipt of the manual submission of appeals and supporting documents.

FIG. 5-184

Payers with an electronic interface receive the electronic transmission of appeals and supporting documentation that have been submitted by subscribers. Payers receive only those appeals that are specific to that company.

FIG. 5-186

The payer is provided with the opportunity to receive the appeal form and supporting documentation either through an electronic file to a designated address or notification that new appeal information has been submitted and directs the payer to its eAppealSolutions log in screen.

FIG. 5-188

If the payer does not have an electronic interface as identified within the payer profile found in the appeals database, the appeals form and supporting documentation are sent to the payer in paper form.

FIG. 5-190

This Figure reflects the systems extraction of appropriate data elements necessary to produce U.S. Postal standard mail.

FIG. 5-192

The system coordinates the printing of the transmittal letter, the eZappeal form and any supporting documents onto appropriate stationary, prints properly addressed envelopes and manages the mailing process.

FIG. 5-194

The system confirms and tracks that the appeal and any supporting documents are mailed to the appropriate payer. The routine is now complete.

FIG. 6-198

Figure 13:
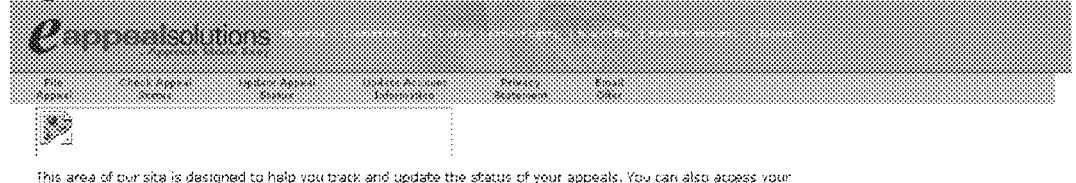
FIG. 13 illustrates a data screen according to one embodiment of the invention.

Upon presentation of FIG. 13-600, the subscriber selects "Print" from the subscriber's remote workstation. A facsimile cover sheet identical to fax screen 600 is printed on the subscriber's remote workstation and is used as the facsimile cover sheet to send that document or documents deemed necessary by the subscriber to further substantiate their appeal.

FIG. 6-200

Figure 6:
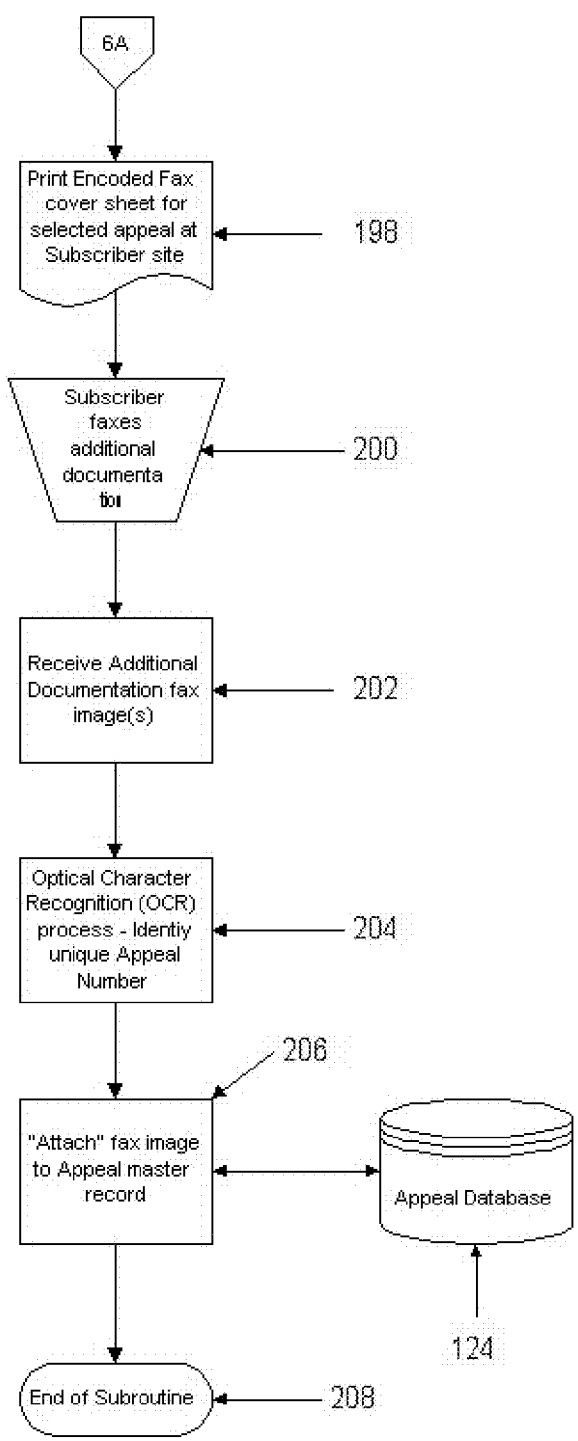
FIG. 6 illustrates a fax additional documentation routine according to one embodiment of the invention.

Utilizing the facsimile cover sheet produced by FIG. 6-198, the subscriber faxes additional information pertinent to the appeal via the appropriate facsimile telephone number issued to them.

FIG. 6-202

The receiving facsimile device will answer and receive the electronic facsimile image of the facsimile cover sheet and additional information. This receiving station is a secured network server capable of facsimile functions.

FIG. 6-204

After completion of the facsimile transmission, the above described computer device will automatically initiate another software application that reads the electronic image of the facsimile cover sheet, applies Optical Character Recognition algorithms and coverts the electronic image into standard ASCII character representations. Embedded within the facsimile coversheet produced in the previous process step is the system generated appeal number which uniquely identifies and associates all of the appeal information with the subscribing submitter as defined by their secured access profile. The remaining portion of the electronic image, less the facsimile coversheet, is then saved as a standard image format file.

FIG. 6-206

The remaining portion of the facsimile transmission as described in FIG. 6-204 is then linked to the appeal as supplemental information, available for viewing during the review stage of the appeal. This data is then refreshed in the appeal database 124.

FIG. 6-208

The subroutine is complete.

FIG. 7-210

Upon selection of the "Upload" function, a web screen demonstrated by upload screen 700 as shown in FIG. 21 is presented. By selecting the "Browse" button on upload screen 700, the subscriber's remote machine is available for searching, identifying, and selecting those files prepared for upload to EappealSolutions.com by the subscriber.

FIG. 7-212

By highlighting the files with the click of the mouse, files are marked for upload. The subscriber then chooses the "Upload" button and the transmission of these files is completed via SSL secured data transfer through the World Wide Web.

FIG. 7-214

Receipt of the transmitted data is accomplished by EappealSolutions.com via SSL exchange and staged for processing.

FIG. 7-216

Immediately upon staging as described in FIG. 7-124, these data files are processed by proprietary algorithms designed to extract the available data elements from a standard HCFA 1500, NSF ver 2.0 or 3.0, UB92, or ANSII format of standardized data forms serving the health care industry. These data elements are written to the database and assigned a unique appeal number associated with the subscriber's security profile as passed by the remote workstation.

FIG. 8-12, 8-14, 8-16, 8-18, and 8-20

Figure 8:
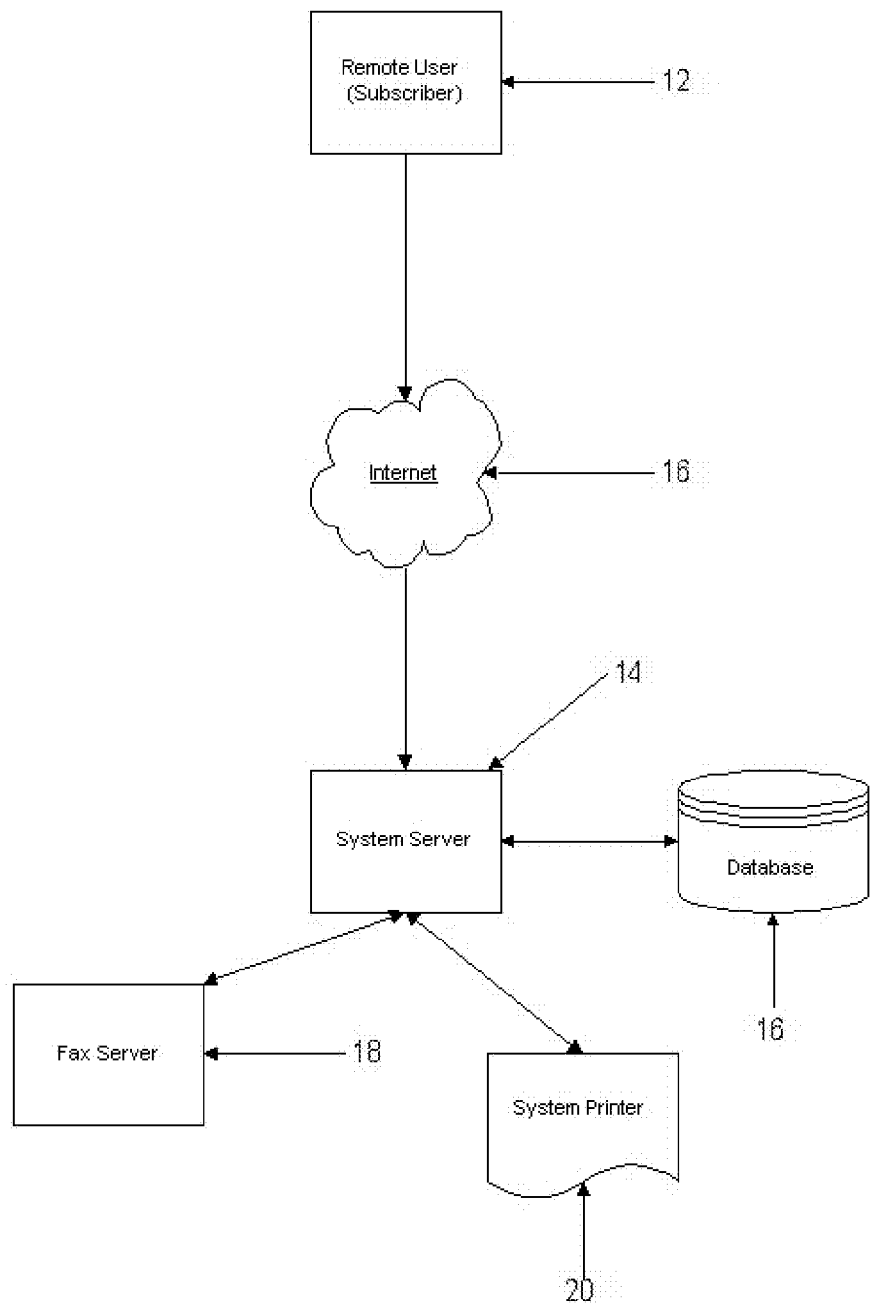
FIG. 8 illustrates a block diagram of the system according to one embodiment of the invention.

FIG. 8 and the labeled symbols demonstrate a typical system whereby "Subscriber" 12 accesses the system server 14 and peripheral equipment through secured socket layers via the World Wide Web 16. Illustratively, the provider, consumer, appeal, and payer databases reside within database 16. As "Subscriber" 12 activates their account, the verification data required to identify this subscriber is accessed from database 16 as requested by the instructions issued from the system server 14 as a result of the execution of the software resident there. Millions of other instructions will be issued to database 16 from system server 14 during the execution of request from Subscriber 12 to access, update, edit, and submit their appeals. When Subscriber 12 elects to submit additional documentation via the request to "Fax Additional Information" (FIG. 6), instructions issued by system server 14 to the Subscriber 12 computer cause the facsimile cover sheet to be printer on the Subscriber printer (not shown) as indicated in step 198. When Subscriber 12 sends the facsimile (step 200), fax server 18 receives the transmission (step 202). The facsimile is processed by Optical Character Recognition by fax server 18 (step 204) and then passes the resulting data to system server 14. After Subscriber 12 has chosen to submit their appeal to the payer (FIG. 4), systematic instructions issued by the scheduling sub-system resident within system server 14 causes the extraction of all appeals (step 164), their corresponding eZappeal form, eZappeal letter, and supporting documentation to be formatted (step 168) for printing on system printer 20 (step 170).

The above described methods and systems enable: (1) Electronic submission of standard Healthcare claim forms, i.e. HCFA1500, UB92, et al; (2) Electronic submission of additional documentation that supports a specific appeal; (3) Unique identification of each subscriber and secured storage of subscriber data; (4) Proprietary algorithms allowing extraction of data from standard Healthcare claims forms into the EZAppeal format, providing standardized appeal data presentation to Healthcare payers; (5) Accurate and specific regulatory rules and regulations pertinent to an appeal and its processing as published by each state and Federal regulatory agency; (6) During the appeal process, each subscriber is regularly notified via email of the most current status and regulatory options specific to their appeal; and (7) Aggregate data and information provided by the invention present profiles of the subscribers appeal submissions, performance, and history at multiple levels of detail. Preferably, information exchanged between the invention and the subscriber are accomplished according to the most current standards applied to Healthcare information exchange, i.e. HIPAA, et al.

The automated appeals system disclosed herein can be used for a wide range of additional service product categories and more value-added services can be included to further personalize the appeals experience. For instance, all businesses with a regulated or contractual appeals or grievance process would benefit from the automation and standardization offered by this process. In industries where a user or a customer has the opportunity to challenge the denial of a service or benefit, the invention could facilitate the appeals process. For example, potential applications of the system will include workers' compensation cases, warranty claims, long term care, and personal injury protection.

Various preferred embodiments of the invention have now been described in fulfillment of the objects of the invention. While these embodiments have been set for the by way of example, various other embodiments and modifications will be apparent to those skilled in the art.

What is claimed is:

1. A computerized method for automating health care benefit claim processing, comprising:
   electronically storing data descriptive of a plurality of health care benefit claim submissions in a computerized database;
   electronically converting the health care benefit claim submission data from one or more of the plurality of health care benefit claim submissions to a specified health care benefit claim submission format by use of a computer; and
   transmitting at least a portion of the converted health care benefit claim submission data to a health care benefit payer, wherein the health care benefit claim submission data relates to a request for reconsideration of a determination of entitlement to benefits or services;
   wherein the specified format is for use in health care benefit claim processing.

2. The method of claim 1, further comprising electronically receiving health care benefit claim submission data descriptive of a plurality of health care claims from a health care provider computer.

3. The method of claim 1, further comprising transmitting at least a portion of the health care benefit claim submission data to the health care benefit payer in electronic form.

4. The method of claim 1, further comprising transmitting at least a portion of the health care benefit claim submission data to the health care benefit payer in paper form.

5. The method of claim 1, further comprising electronically extracting available data elements from a standardized data form.

6. The method of claim 1, further comprising retrieving health care benefit claim submission data from the computerized database for transmitting to the health care benefit payer.

7. The method of claim 1, further comprising determining whether the health care benefit payer has an electronic interface based on a health care benefit payer profile.

8. The method of claim 1, wherein transmitting at least a portion of the health care benefit claim submission data to a health care benefit payer comprises transmitting at least a portion of data previously sent to the health care benefit payer.

9. The method of claim 1, further comprising electronically converting the health care benefit claim submission data from one or more of the plurality of health care benefit claim submissions to a health care benefit claim submission format by use of a computer.

10. A computerized system for an automated health care benefit claim process, comprising:
    a server comprising an electronic database for storing health care benefit claim data, wherein the server is further configured or arranged to:
    electronically store data descriptive of a plurality of health care benefit claims in the electronic database;
    electronically convert health care benefit claim data from one or more of the plurality of health care benefit claims to a specified health care benefit claim submission format; and
    transmit at least a portion of the converted health care benefit claim submission data to a health care benefit payer, wherein the health care benefit claim submission data relates to a request for reconsideration of a determination of entitlement to benefits or services;
    wherein the specified format is for use in health care benefit claim processing.

11. The computerized system of claim 10, wherein the server is further configured or arranged to electronically receive health care benefit claim submission data descriptive of a plurality of health care benefit claim submissions from a health care provider.

12. The computerized system of claim 10, wherein the server is further configured or arranged to transmit at least a portion of the converted health care benefit claim submission data to the health care benefit payer in electronic form.

13. The computerized system of claim 10, wherein the server is further configured or arranged to transmit at least a portion of the converted health care benefit claim submission data to the health care benefit payer in paper form.

14. The computerized system of claim 10, wherein the server is further configured or arranged to determine whether the health care benefit payer has an electronic interface based on a health care benefit payer profile.

15. The computerized system of claim 10, wherein the server is further configured or arranged to electronically extract available data elements from a standardized data form.

16. The computerized system of claim 10, wherein the server is further configured or arranged to retrieve health care benefit claim submission data from the electronic database for transmitting to the health care benefit payer.

17. The computerized system of claim 10, wherein the server is further configured or arranged to provide a graphical user interface for collecting data descriptive of a plurality of health care benefit claim submissions.

18. A computerized method for an automated health care benefit claims submission process, comprising:
- receiving electronic health care benefit claim submission data from a health care provider;
- electronically storing the health care benefit claim submission data from the health care provider in a computerized database;
- receiving an identification of a basis for a health care benefit claim submission;
- automatically generating a health care benefit claim submission comprising the identified basis for the health care benefit claim submission and arranged according to a specified format by use of a computer; and
- sending the formatted health care benefit claim submission to a health care benefit payer, wherein the health care benefit claim submission relates to a request for reconsideration of a determination of entitlement to benefits or services;
- wherein the specified format is for use in health care benefit claim processing.

19. The method of claim 18, further comprising retrieving health care benefit claim submission data from the computerized database for transmitting to the health care benefit payer.

20. The method of claim 18, further comprising transmitting at least a portion of the health care benefit claim submission data to the health care benefit payer in electronic form.

21. The method of claim 18, further comprising transmitting at least a portion of the health care benefit claim submission data to the health care benefit payer in paper form.

22. A computerized method for automating appeal processing, comprising:
- electronically storing data descriptive of a plurality of health care benefit claim submissions in a computerized database;
- electronically converting the health care benefit claim submission data from one or more of the plurality of health care benefit claim submissions to a specified health care benefit claim submission format by use of a computer; and
- transmitting at least a portion of the converted health care benefit claim submission data to a health care benefit payer, wherein the health care benefit claim submission data relates to a request for reconsideration of a determination of entitlement to benefits or services;
- determining if a denial of an entitlement to benefits or services has been received in response to the request for reconsideration;
- if a denial of the entitlement to benefits or services has been received,
- electronically converting the health care benefit claim submission data from one or more of the plurality of health care benefit claim submissions to a specified appeal format by use of a computer; and
- transmitting at least a portion of the converted appeal data to a health care benefit payer, wherein the appeal data relates to a request for reconsideration of a determination of entitlement to benefits or services.

* * * * *